United States Patent
Chang et al.

(10) Patent No.: US 10,784,775 B1
(45) Date of Patent: Sep. 22, 2020

(54) SWITCHING CONVERTER WITH REDUCED DEAD-TIME

(71) Applicant: Dialog Semiconductor (UK) Limited, London (GB)

(72) Inventors: Hyungtaek Chang, Gilbert, AZ (US); Bryan Quinones, Chandler, AZ (US); Michael Jayo, Gilbert, AZ (US)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/596,947

(22) Filed: Oct. 9, 2019

(51) Int. Cl.
*H02M 1/00* (2006.01)
*H02M 1/38* (2007.01)
*H02M 1/08* (2006.01)
*H02M 3/158* (2006.01)

(52) U.S. Cl.
CPC ............... *H02M 1/38* (2013.01); *H02M 1/08* (2013.01); *H02M 3/158* (2013.01)

(58) Field of Classification Search
CPC .......... H02M 1/38; H02M 1/08; H02M 3/158; H02M 2003/1566; G05F 1/00
See application file for complete search history.

(56) References Cited

U.S. PATENT DOCUMENTS

| | | | |
|---|---|---|---|
| 10,110,125 B2 | 10/2018 | Hung et al. | |
| 10,469,065 B2 | 11/2019 | Knoedgen et al. | |
| 2017/0093271 A1* | 3/2017 | Lai | H02M 1/088 |
| 2017/0126113 A1* | 5/2017 | Ejury | H03K 17/164 |
| 2019/0273487 A1 | 9/2019 | Knoedgen et al. | |

OTHER PUBLICATIONS

Texas Instruments Application Report, SNVA815A, "Optimizing Efficiency Through Dead Time Control With the LMG1210 GaN Driver," by Nathan Schemm, Feb. 2018, pp. 1-9.

* cited by examiner

*Primary Examiner* — Adolf D Berhane
*Assistant Examiner* — Afework S Demisse
(74) *Attorney, Agent, or Firm* — Saile Ackerman LLC; Stephen B. Ackerman

(57) ABSTRACT

A switching converter with reduced dead-time and without reverse-recovery is disclosed. The switching converter includes a first power switch coupled to a second power switch, a mode detector and a controller. The mode detector is adapted to detect a mode of operation of the first power switch and the second power switch, and to identify a first period during which the first power switch is turned on and operates in a linear mode while the second power switch is turned off. The controller is adapted to bias the second power switch with a predetermined voltage during the first period to turn on the second power switch during a second period. In the second period the first power switch is operating in a saturation mode.

20 Claims, 12 Drawing Sheets

SWITCHING CONVERTER WITH REDUCED DEAD-TIME

TECHNICAL FIELD

The present disclosure relates to a switching converter and method of operating the same. In particular, the present disclosure relates to a switching converter with reduced dead-time and without reverse-recovery.

BACKGROUND

Switching power supplies such as buck, boost or buck-boost converters operate based on the cyclic charge and discharge of an inductor. The control of the charge and discharge phase relies on a pair of power switches often referred to as high-side power switch and low-side power switch. In operation one power switch is used for charging the inductor and the other power switch is used for discharging it. Such switching converters rely on a careful timing operation of the power switches; when one power switch is open the other is closed and vice versa. To prevent the occurrence of short circuits, a delay also referred to as dead-time, is introduced between the switch on time of the high-side power switch and the switch on time of the low-side power switch. However, this approach reduces the efficiency of the switching converter.

SUMMARY

It is an object of the disclosure to address one or more of the above-mentioned limitations. According to a first aspect of the disclosure, there is provided a switching converter comprising a first power switch coupled to a second power switch at a switching node, a mode detector adapted to detect a mode of operation of the first power switch and the second power switch, and to identify a first period during which the first power switch is turned on and operates in a linear mode while the second power switch is turned off, and a controller adapted to bias the second power switch with a predetermined voltage during the first period to turn on the second power switch during a second period, wherein in the second period the first power switch is operating in a saturation mode.

Optionally, the predetermined voltage is less than a threshold voltage at which the second power switch starts drawing a current.

Optionally, the controller is adapted to turn on the second power switch before the switching node reaches a voltage level sufficient to forward bias a body diode of the second power switch.

For instance, the switching node voltage may be decreasing, and the controller may be adapted to turn on the second power switch before the switching node voltage becomes negative. Alternatively the switching node voltage may be increasing, and the controller may be adapted to turn on the second power switch before a first terminal voltage such as a drain voltage increases above a second terminal voltage, such as a source voltage of the second power switch.

Optionally, the mode detector comprises a first detector portion coupled to the first power switch and a second detector portion coupled to the second power switch.

Optionally, the first detector portion comprises a reference voltage circuit adapted to generate a first voltage reference and a second voltage reference, a first comparator adapted to compare a drive voltage for driving the first power switch with the first voltage reference to generate a first control signal, and a second comparator adapted to compare the drive voltage with the second voltage reference to generate a second control signal.

Optionally, the first reference voltage follows a control voltage of the power switch when operating in a linear mode, and wherein the second reference voltage follows a control voltage of the power switch when operating in a saturation mode.

Optionally, the reference voltage circuit comprises a first current source and a second current source, the first current source being coupled to a first current mirror.

Optionally, the second current source is coupled to a second current mirror.

Optionally, the second current source is coupled to the first current mirror.

Optionally, the first detector portion comprises a bias circuit for generating the predetermined voltage.

Optionally, the bias circuit comprises an amplifier coupled to a diode. For instance the amplifier may be unity gain amplifier such as a buffer.

Optionally, the second detector portion is implemented in the same fashion as the first detector portion.

Optionally, the first current source is adapted to generate a first current and the second current source is adapted to generate a second current, wherein the first current is greater than the second current.

Optionally the first power switch is a high-side power switch and the second power switch is a low-side power switch, and wherein a voltage at the switching node becomes negative at some point during the second period.

Optionally, the first power switch is a low-side power switch and the second power switch is a high-side power switch.

Optionally, the switching converter comprises an inductor coupled to the switching node, and the controller is adapted to turn off the low-side power switch while an inductor current of the inductor is negative.

Optionally, the high-side power switch is turned on when the low-side power switch is in saturation to prevent the forward bias of the body diode of the high-side power switch.

According to a second aspect of the disclosure there is provided a method of operating a switching converter having a first power switch coupled to a second power switch at a switching node, the method comprising detecting a mode of operation of the first power switch and the second power switch, identifying a first period during which the first power switch is turned on and operates in a linear mode while the second power switch is turned off, and biasing the second power switch during the first period to turn on the second power switch during a second period, wherein in the second period the first power switch is operating in a saturation mode.

Optionally, the predetermined voltage is less than a threshold voltage at which the second power switch starts drawing a current.

Optionally, the method comprises turning on the second power switch before the switching node reaches a voltage level sufficient to forward bias a body diode of the second power switch.

The options described with respect to the first aspect of the disclosure are also common to the second aspect of the disclosure.

BRIEF DESCRIPTION OF THE DRAWINGS

The disclosure is described in further detail below by way of example and with reference to the accompanying drawings, in which.

DETAILED DESCRIPTION

Figure 1:
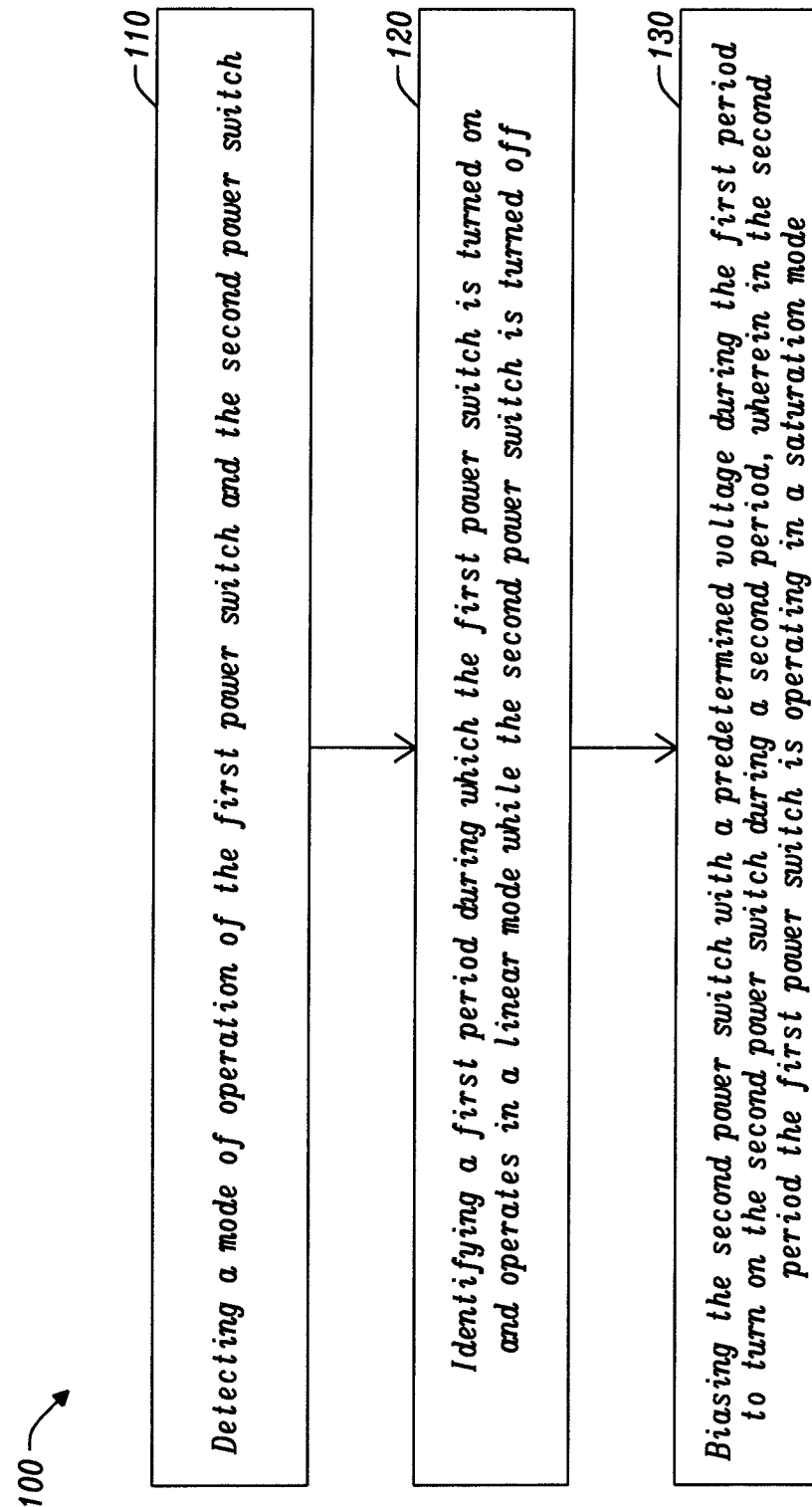
FIG. 1 is a flow chart of a method for operating a switching converter.

FIG. 1 illustrates 100, a flow chart of a method for operating a switching converter that includes a first power switch coupled to a second power switch at a switching node. For instance the first power switch may be a high-side power switch, and the second power switch may be a low-side power switch.

At step 110 a mode of operation of the first power switch and the second power switch is detected. At step 120 a first period is identified during which the first power switch is turned on and operates in a linear mode while the second power switch is turned off. At step 130 the second power switch is biased with a predetermined voltage during the first period to turn on the second power switch during a second period. In the second period the first power switch is operating in a saturation mode. For instance the predetermined voltage may be less than a threshold voltage at which the second power switch starts drawing a current. The method allows reducing the dead-time of the switching converter and prevents the occurrence of reverse recovery.

Figure 2:
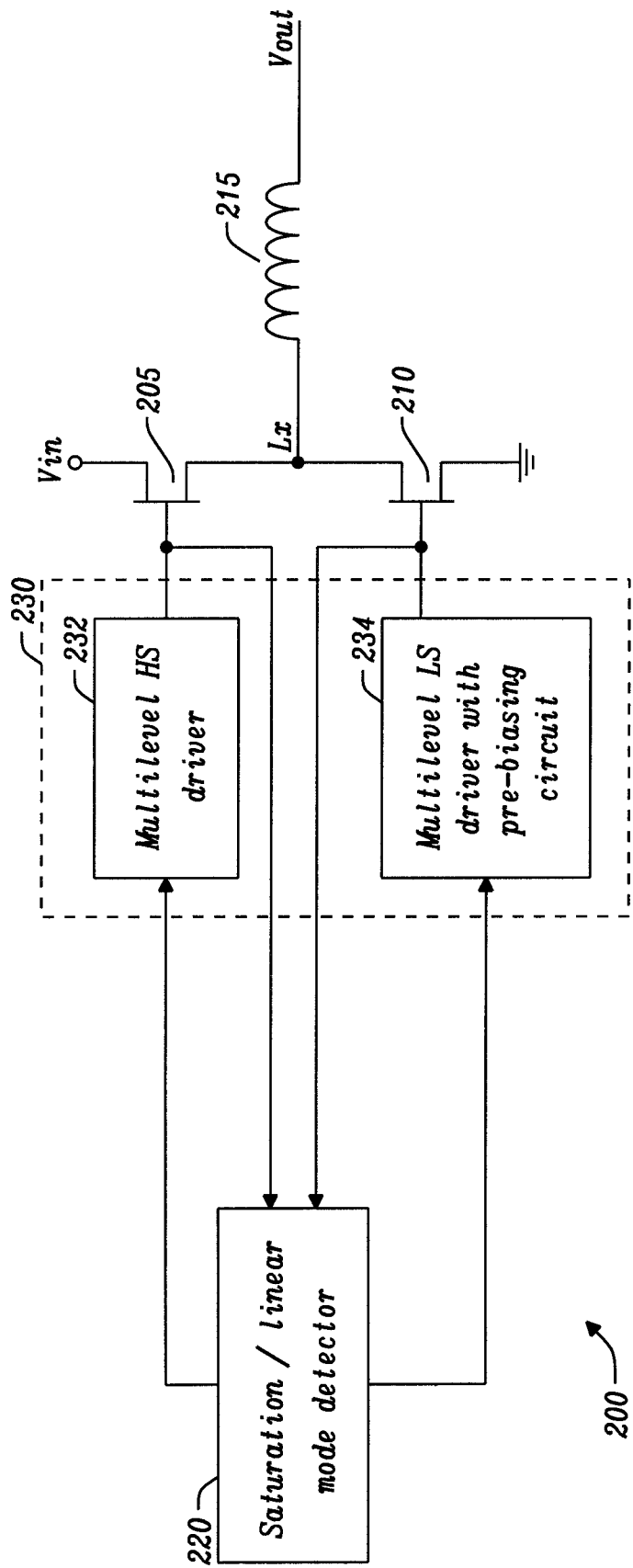
FIG. 2 is a diagram of a switching converter for implementing the method of FIG. 1.

FIG. 2 illustrates a diagram of a switching converter for implementing the method of FIG. 1. The switching converter 200 includes an output stage coupled to a mode detector 220 and a controller 230. The output stage includes a half-bridge formed of a high-side power switch 205 coupled to a low-side power switch 210. The high-side power switch has a first terminal for receiving an input voltage Vin and a second terminal coupled to a switching node Lx. The low-side power switch has a first terminal coupled to the switching node and a second terminal coupled to ground. The switching node Lx is coupled to an inductor 215 to provide an output voltage Vout. The high-side power switch 205 and the low-side power switch 210 may be implemented by a power transistor such as a power Metal Oxide Semiconductor Field Effect Transistor MOSFET.

The controller 230 includes a high-side driver 232 coupled to a control terminal of the high-side power switch 205 and a low side driver 234 coupled to a control terminal of the low-side power switch 210. The high-side driver 232 and the low-side driver 234 may be multilevel drivers for providing drive voltages of different values. A bias circuit is also provided to bias the low-side power switch or the high-side power switch. The bias circuit may be implemented as part of the controller 230 or as part of the mode detector 220. The mode detector 220 has a first input coupled to the control terminal of the high-side power switch 205, a second input coupled to the control terminal of the low-side power switch 210 as well as two outputs, the first output being coupled to the high-side driver 232 and the second output being coupled to the low-side driver 234.

In operation, the high-side power switch 205 and the low-side power switch 210 will be switched on and off alternately. The mode detector 220 is adapted to identify the mode of operation of the high-side power switch 205 and the low-side power switch 210, respectively. A power switch may operate in a linear mode or in a saturation mode. In the linear mode of operation the magnitude of a current flowing through the power switch, for instance between its drain and source terminal, will increase linearly for an increased drain voltage. For an N-type MOSFET the conditions required are that Vgs>Vth and Vds<Vgs−Vth, in which Vgs is the gate to source voltage, Vds the drain to source voltage and Vth the threshold voltage of the power switch. Beyond these conditions, that is when Vgs>Vth and Vds>Vgs−Vth, the transistor operates in a saturation mode and the current stop increasing linearly.

The mode of operation of the power switches may be monitored during a first transition period when the high-side power switch 205 is being turned off and the low-side power switch 210 is being turned on. The mode detector 220 is then configured to identify a first period during which the high-side power switch 205 is turned on and operates in the linear mode while the second power switch, in this case the low-side power switch 210, is turned off. The controller 220 then receives a signal from the mode detector 220 to bias the low-side power switch 210 during the first period so as to turn on the low-side power switch 210 during a second period when the high-side power switch 205 is operating in a saturation mode.

The mode of operation of the power switches may also be monitored during a second transition period when the high-side power switch 205 is being turned on and the low-side power switch 210 is being turned off. The mode detector 220 is then configured to identify a third period during which the low-side power switch 210 is turned on and operates in the linear mode while the high-side power switch 205 is turned off. The controller 220 then receives a signal from the mode detector 220 to bias the high-side power switch 205 during the third period so as to turn on the high-side power switch 205 during a fourth period when the low-side power switch 210 is operating in a saturation mode.

Figure 3:
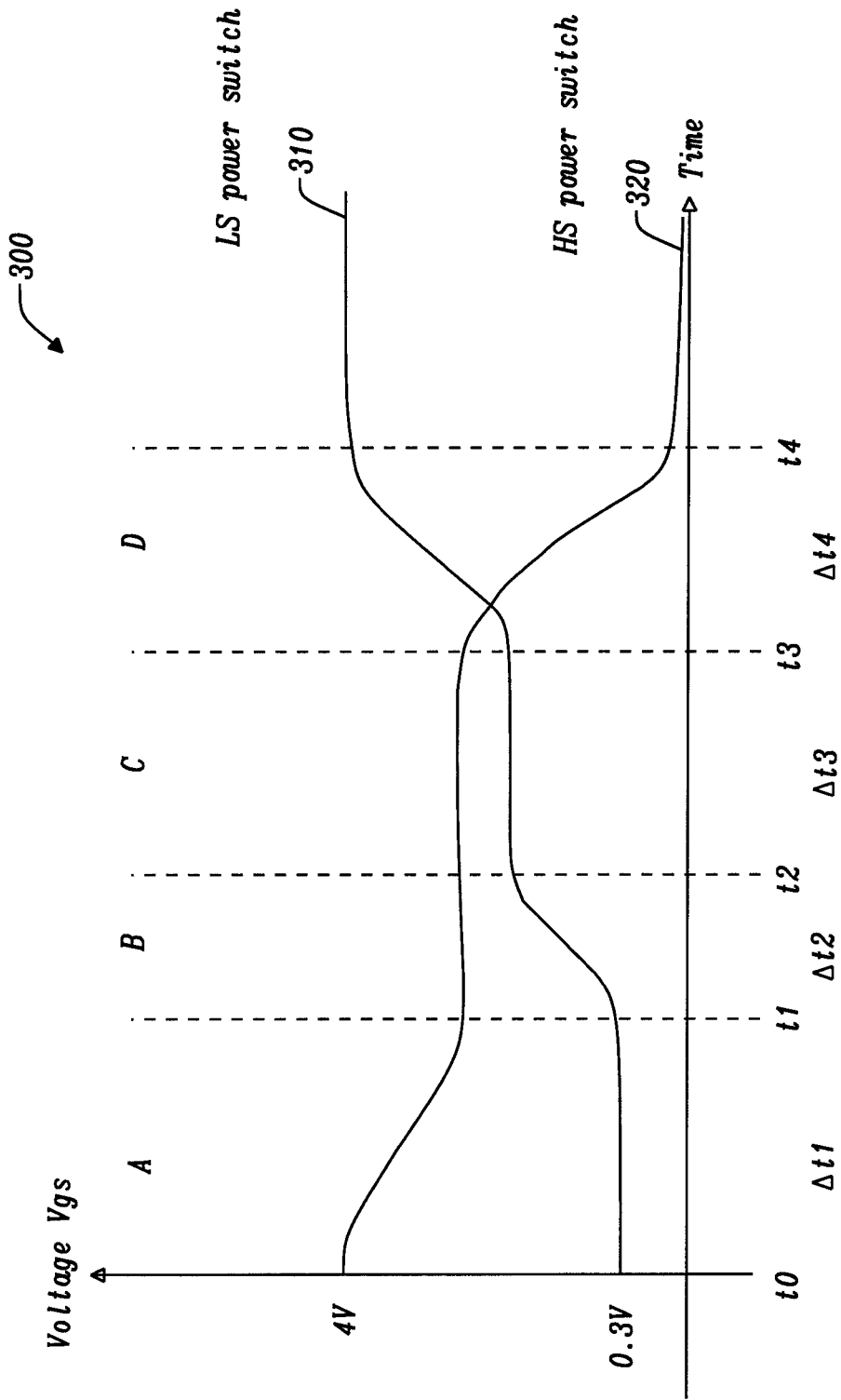
FIG. 3 is a plot of the time dependent gate to source voltages of the power switches of the switching converter of FIG. 1.

FIG. 3 illustrates 300, the time dependence of the gate to source voltage Vgs(HS) 320 of the high-side power switch 205 and the time dependence of the gate to source voltage Vgs(LS) 310 of the low-side power switch 210 obtained during a transition period during which the high-side power switch 205 is being turned off and the low-side power switch 210 is being turned on. This transition period may be divided into four regions labelled A, B, C and D.

In a first time period Δt1 between the times t0 and t1 (region A), the high-side power switch 205 is switched on and operates in a linear mode while the low-side power switch 210 is switched off. During the first time period the low-side power switch 210 is biased to a predetermined voltage. The pre-bias voltage is chosen to be sufficiently high in order to speed up the turn on time of the low-side power switch 210 in the next period but lower than the switch threshold voltage Vth, so that the low-side power switch 210 does not draw any current. In this example, the pre-bias voltage is 0.3V. As the high-side power switch 205 is being turned off, its on-resistance increases as the gate to source voltage (Vgs) is lowered. The drain to source voltage Vds(HS) of the high-side power switch 205 is a function of the current conducting through the on-resistance of the power switch and therefore increases slightly during the first period.

At time t1 the Vgs(HS) 320 reaches the point where the current capability is equal to the current required by the inductor 215 (region B), the high-side power switch 205 starts operating into the saturation mode. At this point, the Vds(HS) increases quickly. As the Vgs(HS) is further lowered, its current capability is lowered, and the inductor causes the voltage at the switching node VLX to decrease. The current flowing through the high-side power switch 205 goes entirely to the inductor. Stated another way, there is no current passing through the low-side power switch 210, therefore preventing the occurrence of any short circuit. At this point, the low-side power switch can be turned on safely without causing any shoot-through current or short circuit since the HS power switch is not capable of running any more current.

When the switching node voltage goes negative around time t1, the low-side power switch 210 turns on lightly. This is because the gate to source voltage of the low-side power switch Vgs(LS) increases to a level that enhances the low-side power switch 210. Since the entire current passing through the high-side power switch 205 goes to the inductor, the dead-time between the high-side power switch and the low-side power switch can be greatly reduced.

The low-side power switch 210 is turned on before the switching node voltage VLX reaches a value that would forward bias the body diode of the low-side power switch 210. As a result, the inductor L is prevented from drawing a current IL through the body diode of the low-side power switch. This improves the efficiency of the system as such a recovery process would lead to unwanted power dissipation. For instance, when changing between reverse and forward bias a current is required to change the state of charge of the diode.

Between the times t1 and t2 (region B) the high-side power switch 205 remains on and is now operating in the saturation region. In region B, the mode of operation of the low-side power switch 210 depends on the voltage at the switching node VLX. When the high-side power-switch is in the saturation region, VLX decreases. If the low-side power-switch turns on while VLX is still relatively high, then the low-side power switch operates in the saturation mode. However, if the low-side power-switch does not turn on until VLX becomes negative, then it operates in the linear mode. As explained above, if the low-side power-switch turns on such that its body diode is not forward biased, then reverse-recovery is prevented.

In the third time period Δt3, between the times t2 and t3 (region C), the high-side power switch and the low-side power switch are both turned on and operate in saturation mode.

In the fourth time period Δt4, between the times t3 and t4 (region D), the Vgs (LS) increases further to turn the low-side power switch fully around time t4. The Vgs(HS) decreases and the high-side power switch becomes fully turned off around time t4. In the region D the low-side power switch operates in linear mode, while the high-side power switch transits from saturation mode to complete shutdown.

It will be appreciated that the switching converter may be operated in a similar fashion during a transition period in which the high-side power switch is being turned on and the low-side power switch is being turned off.

For example, in a buck converter the LS power-switch may be turned off when the inductor current is negative. In this case the controller identifies a region during which the low-side power switch operates in a saturation mode and the high-side power switch is pre-biased to turn on in that region.

Figure 4A:
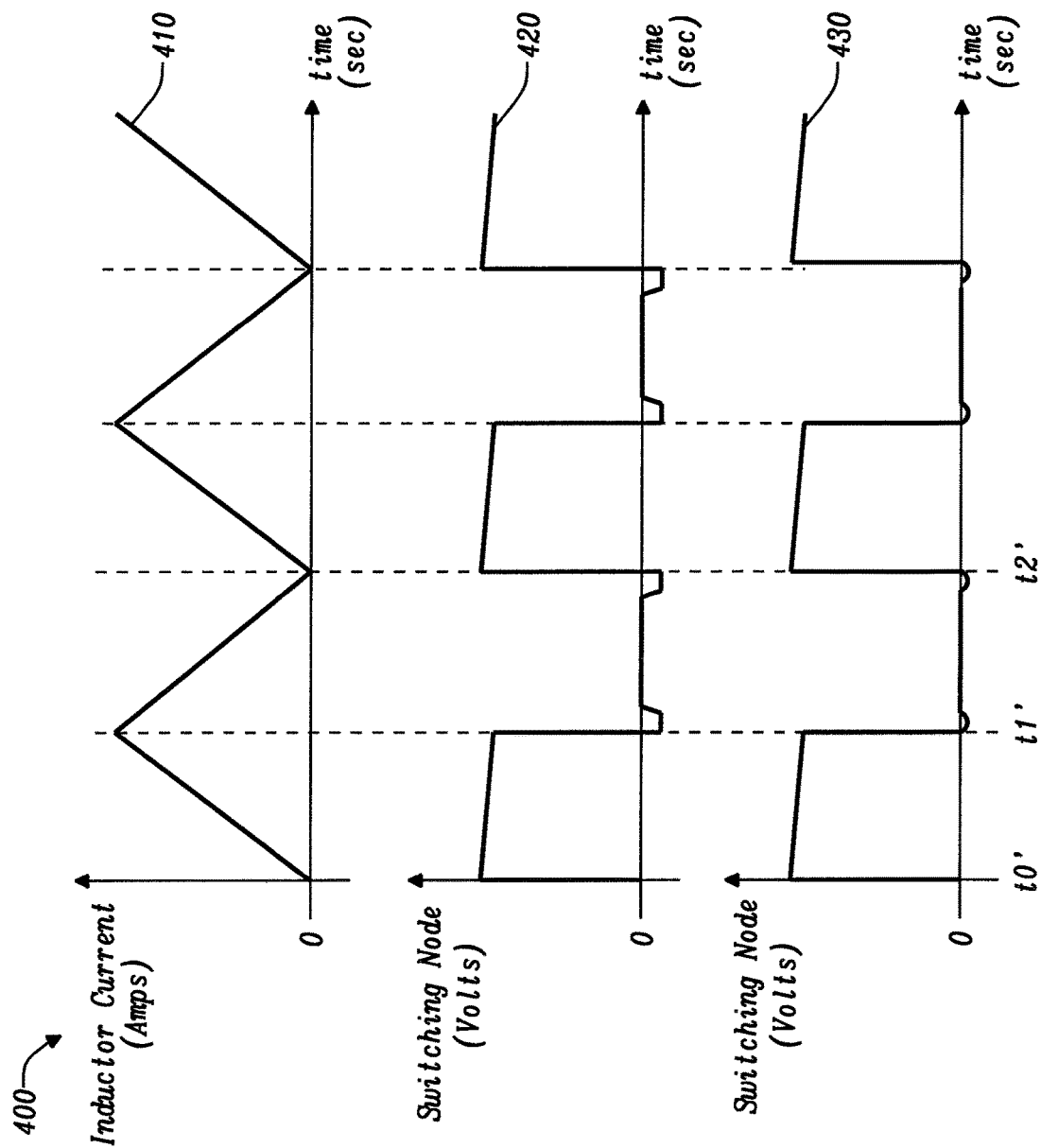
FIG. 4A is a plot of the switching node voltage obtained for a conventional switching converter and for the switching converter of FIG. 2, when the inductor current remains positive.

FIG. 4A shows 400, the variation of the voltage at the switching node when the inductor current remains positive. The VLX variations are shown for a conventional converter operating in Continuous Conduction Mode (CCM) and for a converter implementing the method of FIG. 1. The waveform 410 shows the variations of the inductor current during the on/off switching cycle of the high-side and low-side power switches. The waveform 420 illustrates the switching node voltage variation for a conventional switching converter. The waveform 430 illustrates the switching node voltage variation for a switching converter according to FIG. 2.

At time t0' the high-side power switch HS is on and the low-side power switch LS is off, the inductor current increases to reach a maximum value at time t1'. At this point the HS power switch is turned off and the LS power switch is turned on. The inductor current decreases to reach a low threshold value at time t2'.

Using the method according to FIG. 1, the switching node voltage 430 goes negative shortly after the point when the inductor current has reached its maximum value. However, the switching node voltage 430 remains to a level sufficiently high to prevent the back body diode of the LS power switch to become forward biased. In contrast for a switching converter operated in a conventional fashion, the switching node voltage 420 goes negative and forward biases the body diode and remains in that condition until the LS power switch turns on. At this point the LS power switch must provide current for inductor current and reverse recovery of its body diode.

Figure 4B:
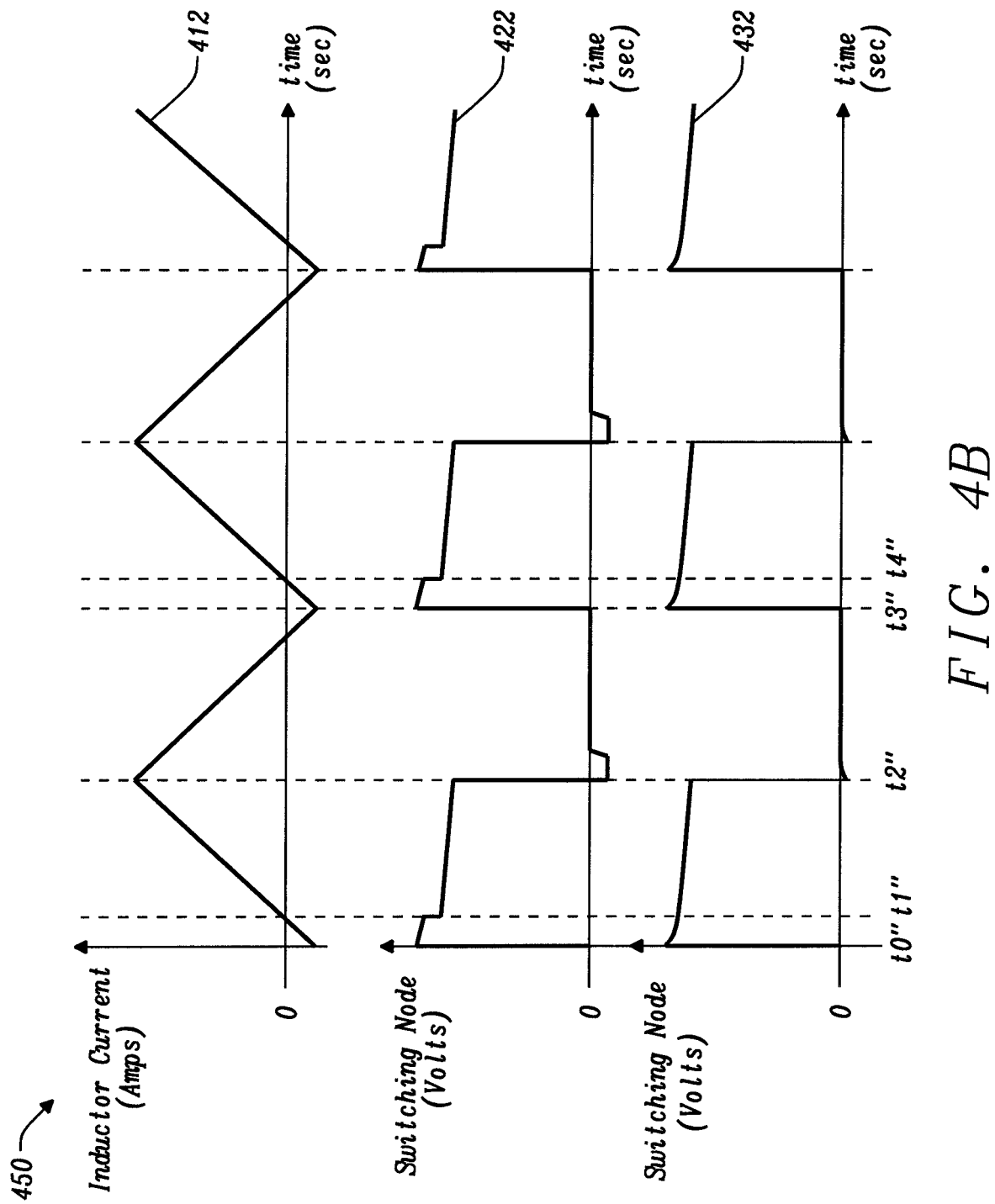
FIG. 4B is a plot of the switching node voltage obtained for a conventional switching converter and for the switching converter of FIG. 2, when the inductor current varies between negative and positive values.

FIG. 4B shows 450, the variation of the voltage at the switching node when the inductor current varies between negative and positive values. The VLX variations are shown for a conventional converter operating in Continuous Conduction Mode (CCM) and for a converter implementing the method of FIG. 1. The waveform 412 illustrates the variations of the inductor current during the on/off switching cycle of the high-side and low-side power switches. The waveform 422 illustrates the switching node voltage variation for a conventional switching converter. The waveform 432 illustrates the switching node voltage variation for a switching converter according to FIG. 2.

Between the times t0" and t1", the inductor current 412 increases from a negative value to a zero current at time t1". Between the time t1" and t2" the inductor current 412 increases up to a maximum value. At this point the HS power switch is turned off and the LS switch is turn on. The inductor current 412 decreases to reach a negative low threshold value at time t3".

In the conventional case the switching node voltage 422 starts at a maximum overshoot value, decreases slightly and drops sharply at time t1". Between the times t0" and t1" the body diode of the high side power switch is forward biased.

At time t2" the switching node voltage 422 goes negative with an amplitude sufficient to forward bias the body diode of the LS power switch.

Using the method according to FIG. 1, the switching node voltage 432 starts at a maximum value at time t0" and decreases gradually until time t2". The initial maximum value of the voltage 422 is less than the drain voltage of the high side power switch, hence preventing forward biasing the body diode of the HS power-switch. After the time t2" the switching node voltage 432 goes negative but remains to a level sufficiently high to prevent the back body diode of the LS power switch from becoming forward biased. The LS power switch is turned off while the inductor current is negative. As the LS power switch turns off the switching node increases at time t3". The LS power switch operates in the saturation region at which point the HS power switch can be turned on and prevent the reverse recovery of the HS power switch.

Figure 5A:
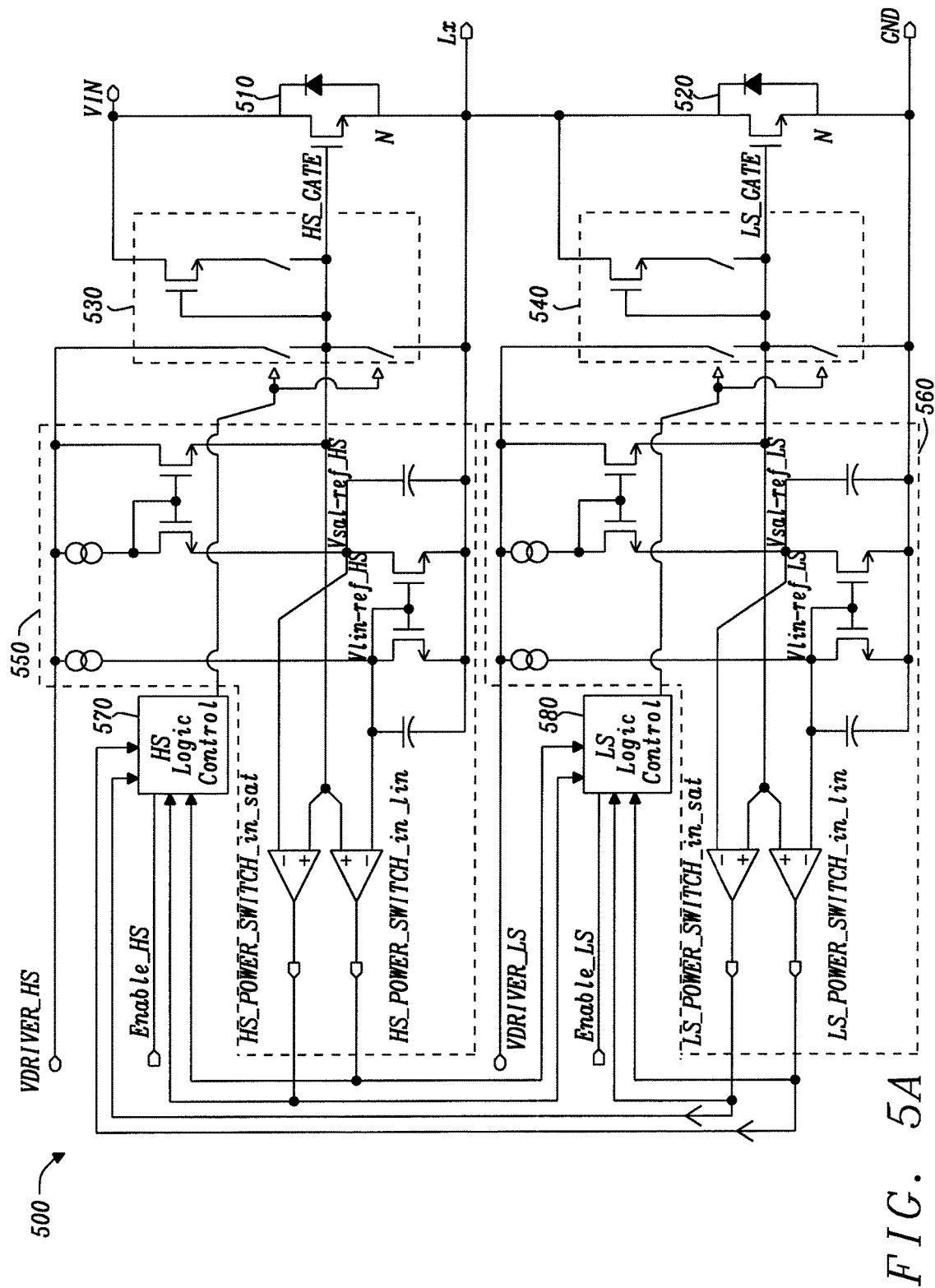
FIG. 5A is an exemplary implementation of the switching converter of FIG. 2.

FIG. 5A illustrates an implementation of the switching converter of FIG. 2. The switching converter 500 includes a high-side power switch 510 coupled to a low-side power switch 520 at a switching node Lx. For instance the power switches may be N-type MOSFETs. In this implementation, the mode detector is provided by the high-side mode detector 550 and a low-side mode detector 560. A high-side logic control 570 is coupled to a high-side driver 530 for driving the high-side power switch 510. The high-side mode detector 550 has an input coupled to the gate of the high-side power switch 510, HS_GATE, and an output coupled to both the high-side and the low-side logic controls 570 and 580, respectively. It will be appreciated that the logic control 570 may be implemented as part of the driver 530. Similarly, a low-side logic control 580 is coupled to a low-side driver 540 for driving the low-side power switch 520. The low-side mode detector 560 has an input coupled to the gate of the low-side power switch 520, LS_GATE, and an output coupled to both the high-side and the low-side logic control 570 and 580, respectively. It will be appreciated that the logic control 580 may be implemented as part of the driver 540. Driver voltages VDRIVER_HS and VDRIVER_LS are provided.

Figure 5B:
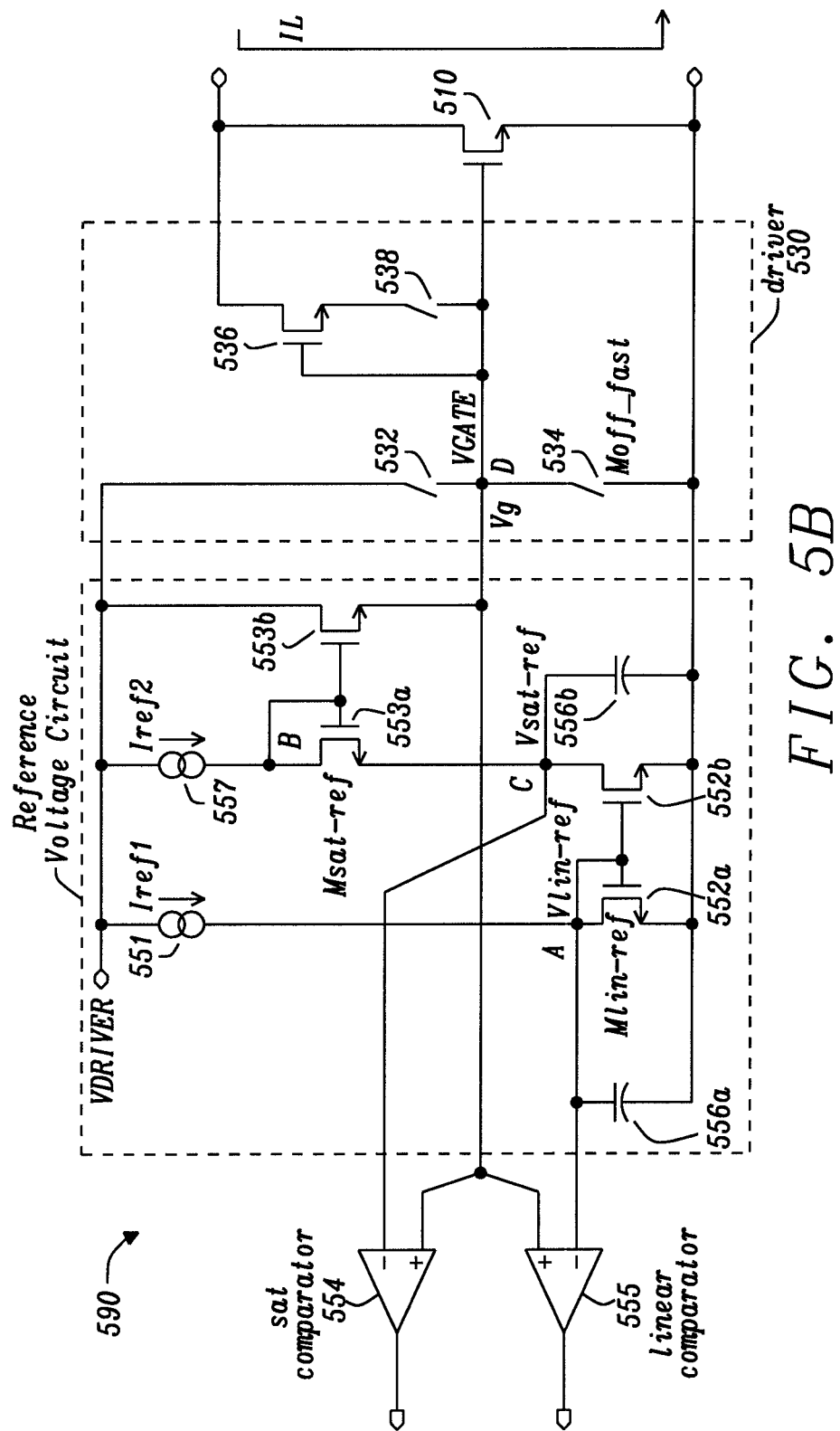
FIG. 5B is a mode detector for use with a power switch.

In the diagram of FIG. 5A, the high-side mode detector 550 and the low-side mode detector 560 are implemented in the same fashion. FIG. 5B is 590, a close-up illustrating this implementation. The mode detector includes a reference voltage circuit to generate a linear voltage reference Vlin-ref and a saturation voltage reference Vsat-ref. The reference voltage circuit is coupled to two comparators: a first comparators 554 referred to as saturation comparator, and a second comparator 555 referred to as linear comparator. The first and second comparators may be implemented as differential amplifiers. The reference voltage circuit includes a first current source 551 for generating a first reference current Iref1, a second current source 557 for generating a second reference current Iref2, a first current mirror formed by transistors 552a and 552b, and a second current mirror formed by transistors 553a and 553b. A capacitor 556a is coupled in parallel with the transistor 552a and another capacitor 556b is coupled in parallel with the transistor 552b. The driver 530 includes a transistor 536 having a gate terminal coupled to the gate of the transistor 510 and a source terminal coupled to the gate of transistor 510 via a switch 538

The first current source 551 is coupled to the input of the first current mirror at node A. The second current source 557 is coupled to the input of the second current mirror at node B. The node A is coupled to the gates of the transistor 552a and 552b. Similarly the node B is coupled to the gates of the transistor 553a and 553b. The transistor Msat-ref 553a is coupled to the transistor 552b at node C. In this example the source terminal of 553a is coupled to the drain terminal of 552b. The output of the second current mirror is coupled to control terminal of the power switch at node D, VGATE. In this example the source terminal of transistor 553b is coupled to node D.

The saturation comparator 554 has a first input for instance an inverting input coupled to node C and a second input for instance a non-inverting input coupled to the control terminal of the power switch 510 at node D. Similarly the linear comparator 555 has a first input for instance an inverting input coupled to node A and a second input for instance a non-inverting input coupled to the control terminal of the power switch 510 at node D.

The transistor 552a, also referred to as linear reference transistor Mlin-ref, may be chosen to be of the same type as the power switch 510. In addition, the size of Mlin-ref 552a may be chosen to be such that the Vgs (Mlin-ref) at the reference current Iref1 is slightly greater than the Vgs of the power switch at the inductor current IL. Similarly, the transistor 553a, also referred to as saturation reference transistor Msat-ref, may be chosen to be of the same type as the power switch 510 and its size to be the same as the size of the transistor Mlin-ref 552a.

In operation, a linear voltage reference Vlin-ref is generated at the input of the first current mirror at node A and a saturation reference voltage Vsat-ref is generated at the output of the first current mirror at node C. The voltage Vsat-ref and Vlin-ref are then used to determine in which mode, either linear or in saturation, is operating the power switch 510. The saturation comparators 554 provides an output proportional to the difference between the gate voltage of the power switch and Vsat-ref. Therefore a positive output signal from comparator 554 indicates that the power switch operates in saturation mode. Similarly the linear comparators 555 provides an output proportional to the difference between the gate voltage of the power switch and Vlin-ref. Therefore a positive output signal from comparator 555 indicates that the power switch operates in linear mode.

Various pre-bias voltages may be generated at the output of the second current mirror. If the transistors 552a and 552b of the first current mirror have the same size, and if Iref1>Iref2, then the transistor 552b operates in the linear region. The second current mirror then acts like a buffer of the voltage Vsat_ref created at node C. The voltage at node C may be adjusted by controlling the difference between Iref1 and Iref 2. In particular, the voltage at node C may be chosen to be lower than Vlin-ref.

The driver 530 includes a pull-up/pull-down stage formed by transistor 532, 534 coupled at node D. The pull-down transistor 534, also referred to as fast turn off Moff_fast, is used to keep the gate of the power-switch 510 off once the gate of the power-switch goes below the saturation voltage. This is to prevent variations in the switching node voltage from inadvertently turning on the other power-switch of the half bridge. When the transistor 534 is closed, it will conduct a current corresponding to the charge stored on the gate of the power-switch, until the gate of the power-switch 510 is equal to its source voltage.

Figure 5C:
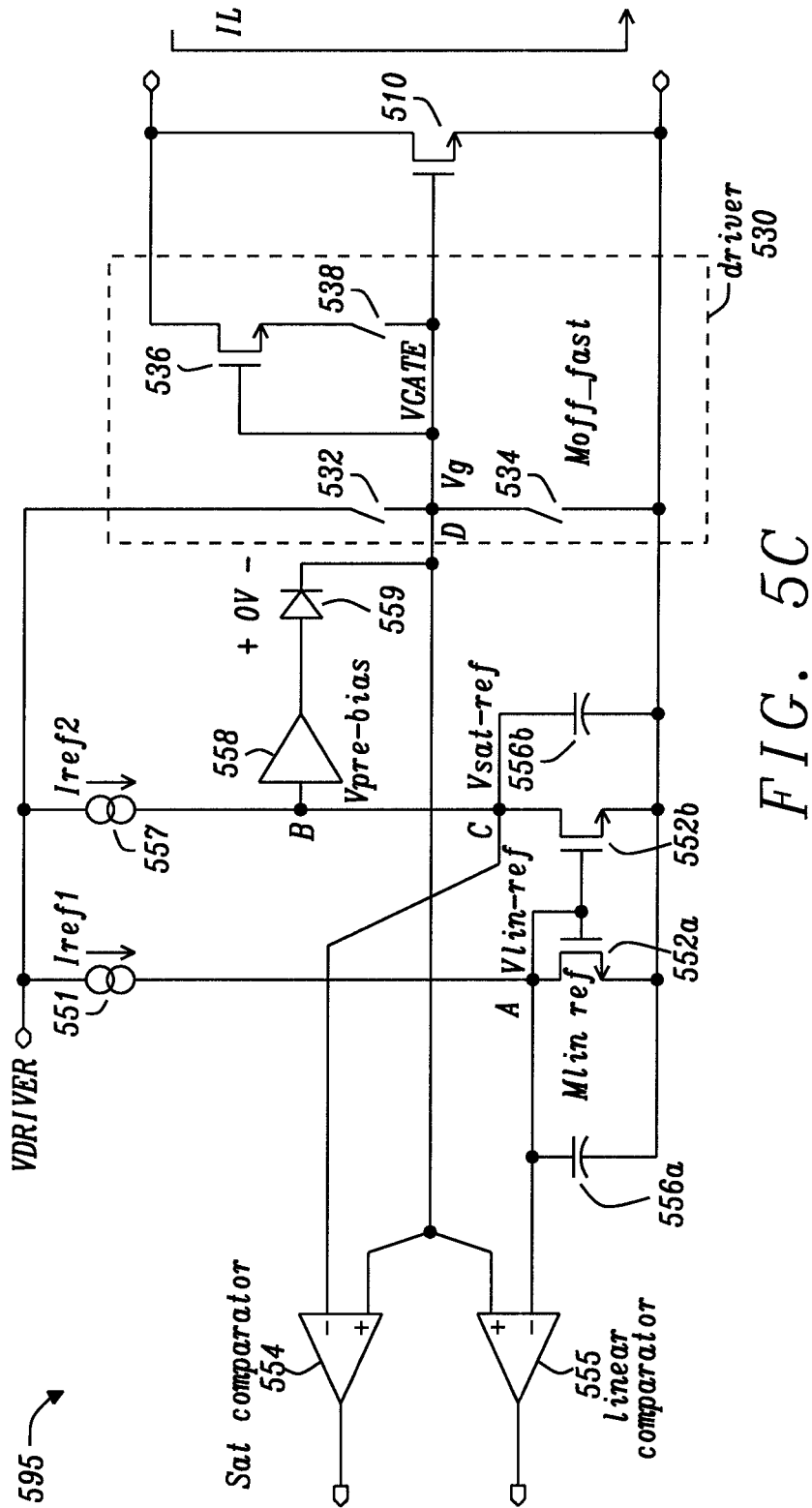
FIG. 5C is another mode detector for use with a power switch.

FIG. 5C illustrates 595, another implementation of a mode detector for use with a power switch. FIG. 5C shares similar components with the circuit of FIG. 5B and the same reference numerals have been used to represent corresponding components. In this embodiment, the second current mirror has been replaced by an amplifier 558 coupled to a diode 559. The second current source 557 is coupled to the amplifier 558 at node B. The diode 559 has an input coupled to output of the amplifier 558 and an output coupled to node D. In operation, the amplifier 558 drives the gate of the power switch 510 to its so-called pre-bias point. The amplifier 558 may be a unity gain amplifier also referred to as a buffer, in which case the pre-bias voltage is equal to the voltage Vsat-ref.

Figure 6:
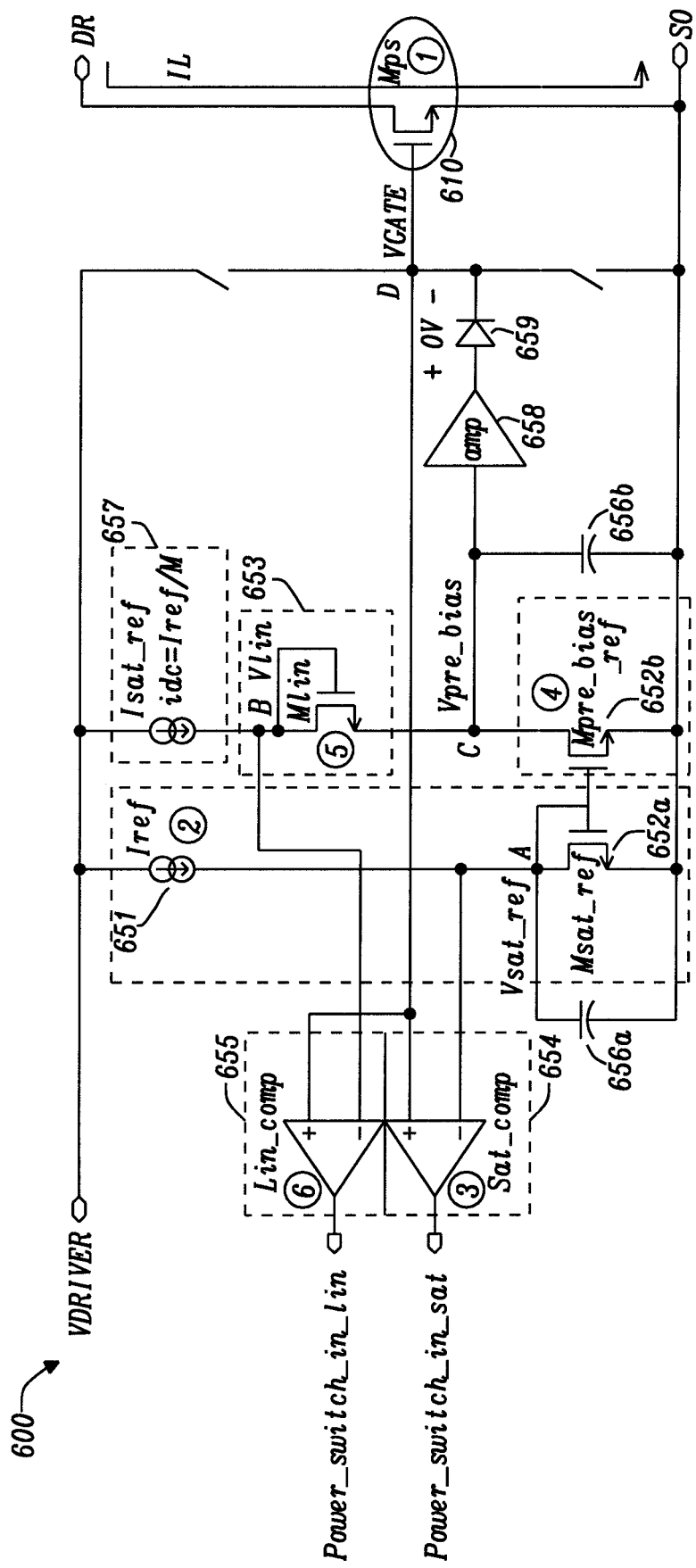
FIG. 6 is yet another mode detector for use with a power switch.

FIG. 6 illustrates 600, yet another embodiment of a mode detector for detecting the mode of operation of a power switch. In this example, the mode detector includes a first current source 651 for generating a reference current Iref, coupled to a current mirror at node A. The current mirror is formed by transistor 652a, referred to as saturation transistor Msat_ref, and transistor 652b referred to as pre_bias transistor Mpre_bias_ref. The node A is coupled to the gates of the transistor 652a and 652b, hence transistor 652a is diode connected. A second current source 657 is coupled to a transistor 653, also referred to as linear transistor Mlin, at node B. The transistor Mlin 653 is diode connected and coupled to the output of the current mirror at node C. The node C is coupled to the control terminal of the power switch via a path formed by an amplifier 658 coupled to a diode 659. A capacitor 656a is coupled in parallel with the transistor 652a and another capacitor 656b is coupled in parallel with the transistor 652b.

A linear comparator 655 has a first input, for instance a non-inverting input coupled to node D and a second input, for instance an inverting input coupled to node B. Similarly, a saturation comparator 654 has a first input, for instance a non-inverting input coupled to node D and a second input, for instance an inverting input coupled to node A.

The size of the transistors 652a and 652b may be chosen such that a ratio of the size of the saturation transistor 652a over the size of power switch 610 is equal to the ratio of the reference current Iref over the inductor current I1.

$$\frac{M_{Sat-ref}}{M_{PS}} = \frac{I_{ref}}{I_L}$$

As a result, when the current Iref flows into the saturation transistor 652a, a voltage reference Vsat-ref is provided at node A that is equal to the gate voltage Vgs of the power switch 610 when the power switch is conducting the inductor current IL.

The saturation transistor Msat-ref may be chosen to be of the same type as the power switch 610, so that the voltage Vsat-ref follows a variation in process and temperatures. The saturation comparator 654 compares the gate voltage of the power switch with Vsat-ref to determine when the power switch 610 has entered the saturation region for a desired inductor current IL. Similarly, the linear comparator 655 compares the gate voltage of the power switch 610 with the linear reference voltage at node B to determine when the power switch has entered the linear region for the desired inductor current IL.

The second current source 657 may be configured to generate a saturation reference current Isat_ref that is less than the reference current Iref generated by the first current source 651. As a result, a drain to source voltage Vds across the pre-bias transistor 652b, is lower than the saturation reference voltage at node A. This forces the pre-bias transistor 652b to operate in linear mode. As a result, the saturation reference current Isat_ref can be manipulated in a linear fashion to create a variety of voltages to be used as pre-bias voltages at node C. As mentioned above, the pre-bias voltage Vpre_bias should be lower than the threshold of the power switch 610.

The linear transistor Mlin 653 may be chosen to be of the same type as the power switch 650, with the size defined by the ratio of the size of the linear transistor Mlin over the size of the power switch to be equal to the ratio Isat-ref/IL.

$$\frac{I_{Sat-ref}}{I_L} = \frac{M_{Lin}}{M_{PS}}$$

As a result, the gate to source of the linear transistor 653 Vgs(Mlin) is equal to the gate to source voltage Vgs of the power switch 610 Vgs(Mps), when the power switch is providing an inductor current IL. So when the gate of the power switch 610 is higher than Vgs by the voltage at node C, the power switch 610 is guaranteed to be operating in the linear region.

The voltage at node B may be expressed as the sum of the voltage at node C with the drain to source voltage of Mlin.

$$V_B = V_C + V_{ds}(M_{Lin})$$

$$V_B = V_{ds}(\text{Mpre\_bias\_ref}) + V_{ds}(M_{Lin})$$

With $V_{ds}(M_{Lin}) < V_{sat-ref}$

Figure 7:
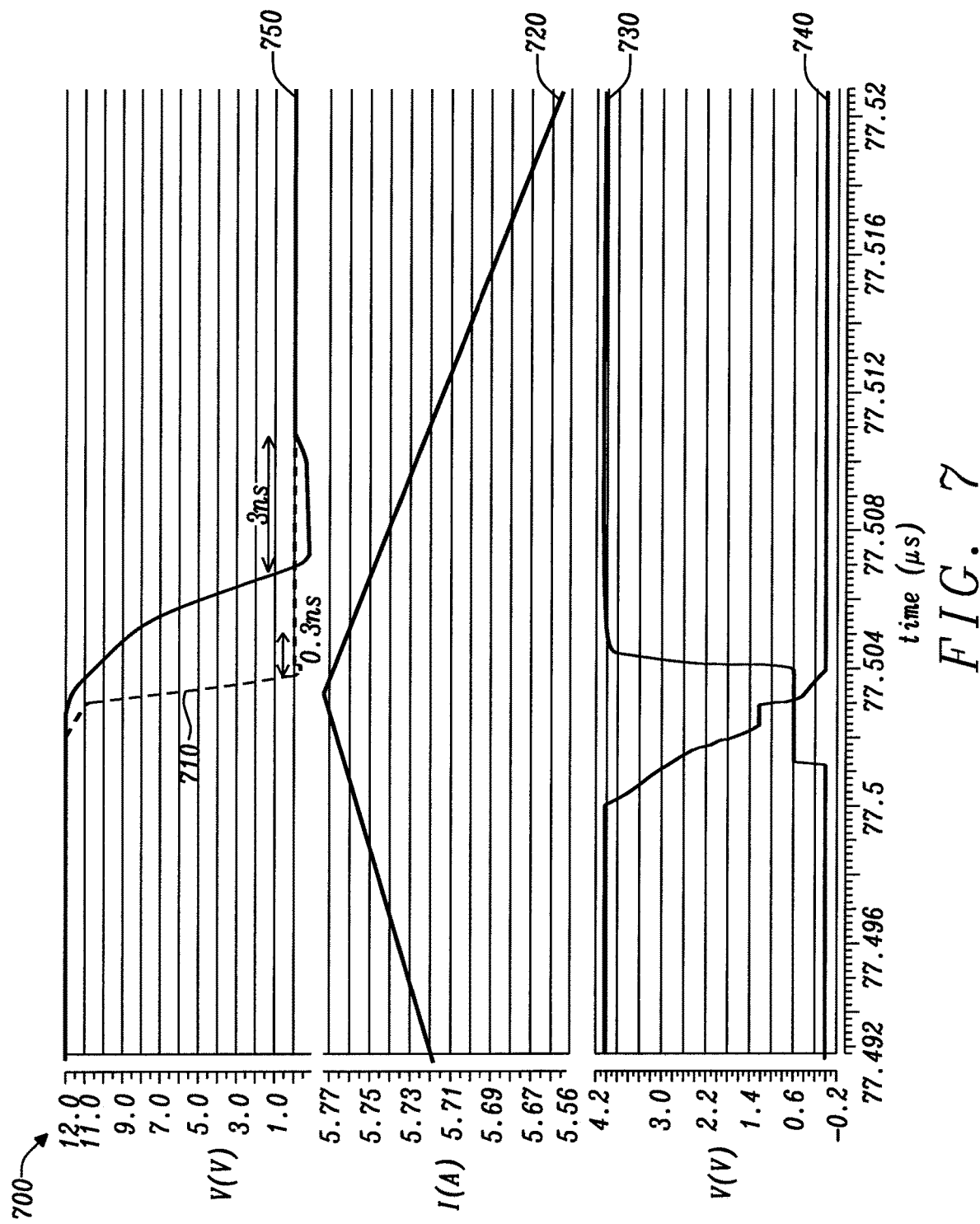
FIG. 7 is a simulation illustrating the working of the switching converter of FIG. 2.

FIG. 7 is a simulation of various parameters of the circuit according to the disclosure. The waveform 710 is a simulation of the voltage at the switching mode Lx. The waveform 720 is a simulation of the inductor current through the inductor L. Waveform 730 is a simulation of the gate voltage at the low-side power switch and waveform 740 is a simulation of the gate voltage at the high-side power switch. In addition, the waveform 750 is the simulation of the voltage at the switching node for a conventional switching converter. According to this simulation, it can be observed that the duration of the dead-time can be reduced by a factor of ten, from about 3 ns to about 0.3 ns. Also, the overshoot on the switching node is significantly reduced. When considering a buck converter having a switching frequency of about 2 MHz, the efficiency may be improved by about 1%. For a buck converter with a higher switching frequency, for instance, 10 MHz, the efficiency gain may be as high as 4-5%.

Figure 8:
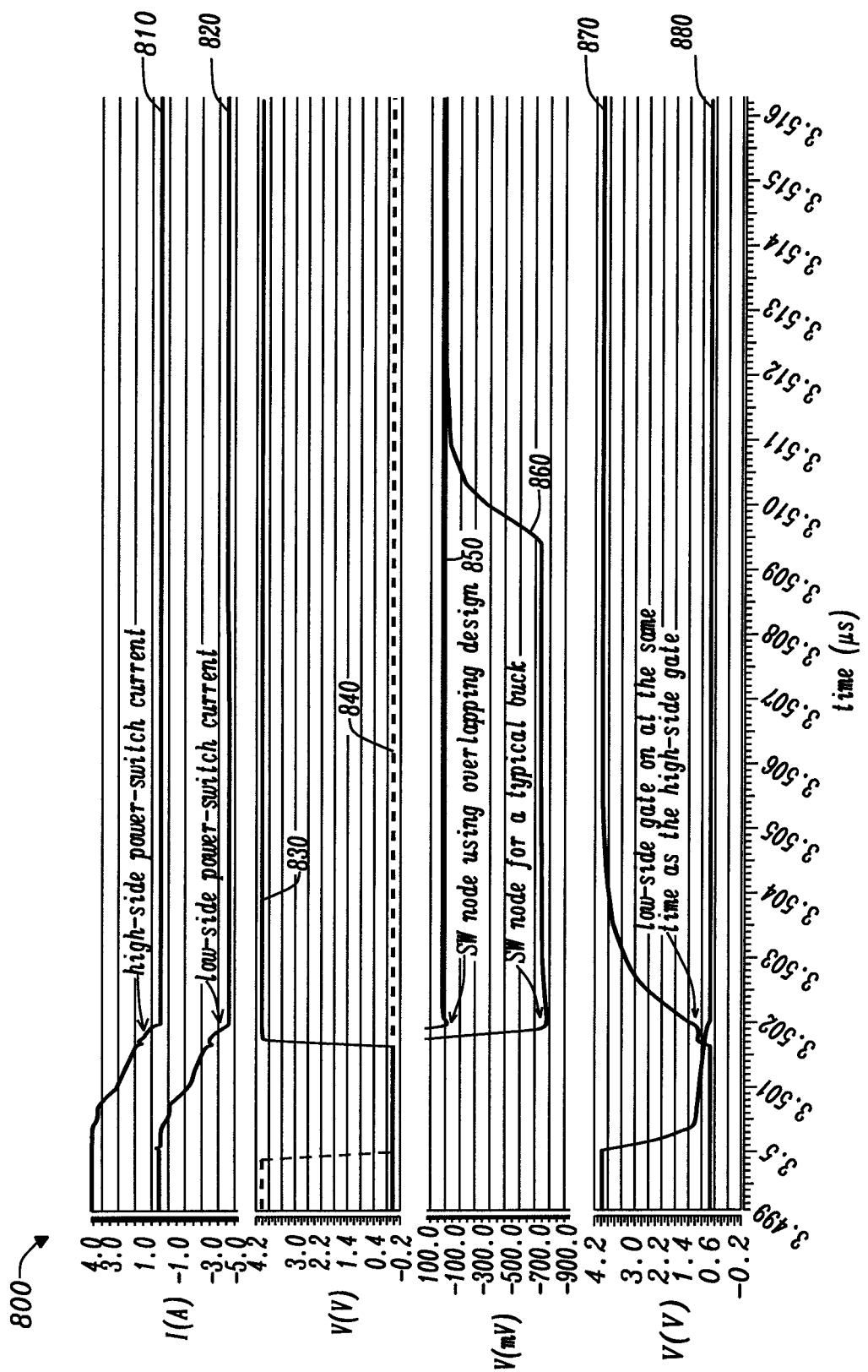
FIG. 8 is another simulation illustrating the working of the switching converter of FIG. 2.

FIG. 8 is a simulation obtained during a transition period when the high-side power switch is being turned off and the low-side power switch is being turned on. The waveform 810 is a simulation of the current through the high-side power switch. The waveform 820 is a simulation of the current through the low-side power switch. The waveforms 830 and 840 are logic signals for turning on or off the low-side power switch and the high-side power switch, respectively. The waveform 850 is a simulation of voltage at the switching node for the converter of the disclosure. The waveform 860 is a simulation of voltage at the switching node for a conventional converter. Waveform 870 is a simulation of the gate voltage at the low-side power switch and waveform 880 is a simulation of the gate voltage at the high-side power switch.

Figure 9:
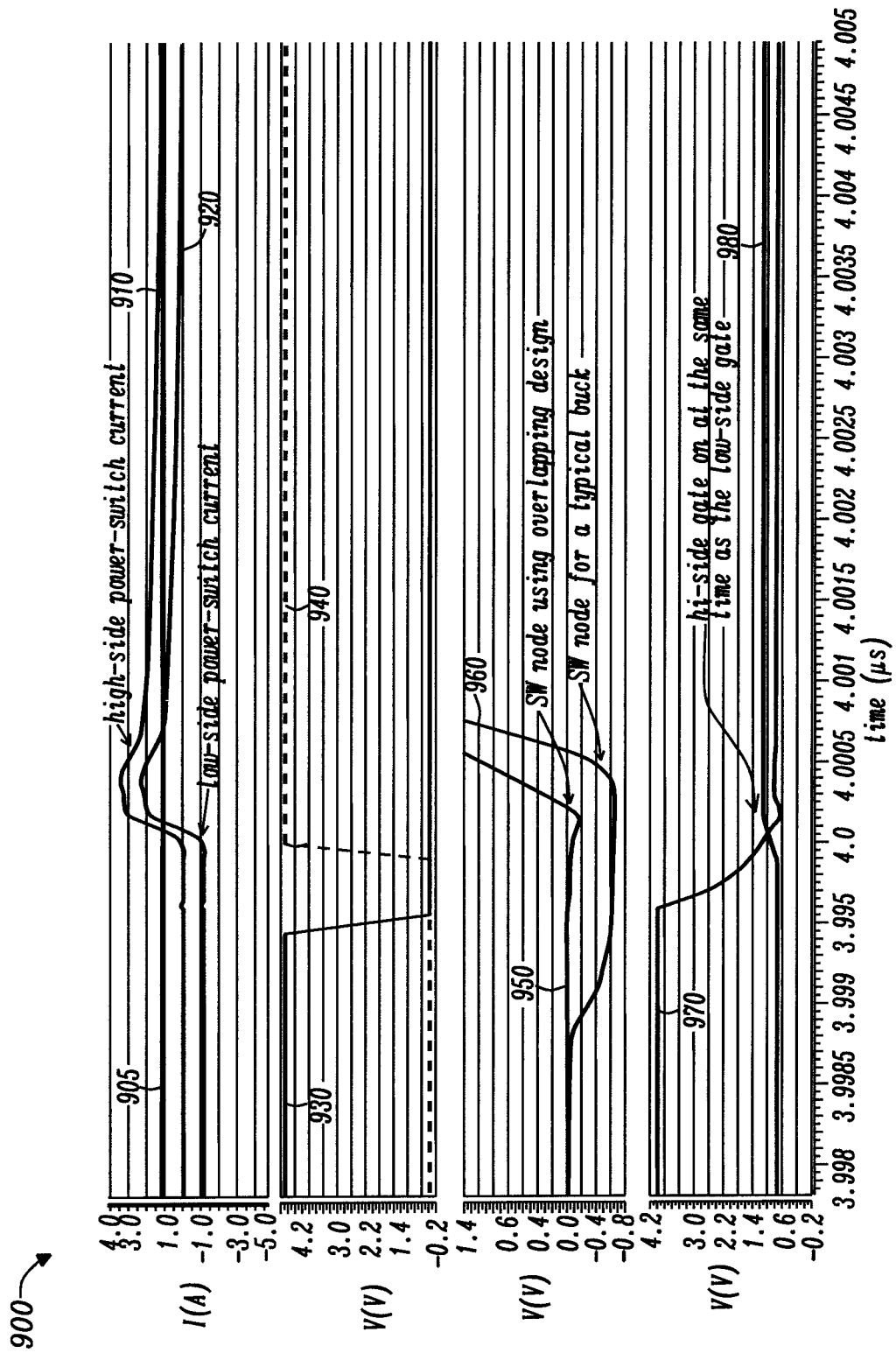
FIG. 9 is yet another simulation illustrating the working of the switching converter of FIG. 2.

FIG. 9 is a simulation obtained during a transition period when the high-side power switch is being turned on and the low-side power switch is being turned off. The waveform 905 is a simulation of the current through the inductor. The waveform 910 is a simulation of the current through the high-side power switch. The waveform 920 is a simulation of the current through the low-side power switch. The waveforms 930 and 940 are logic signals for turning on or off the low side power switch, and the high-side power switch, respectively. The waveform 950 is a simulation of voltage at the switching node for the converter of the disclosure. The waveform 960 is a simulation of voltage at the switching node for a conventional converter. Waveform 970 is a simulation of the gate voltage at the low-side power switch and waveform 980 is a simulation of the gate voltage at the high-side power switch.

A skilled person will appreciate that variations of the disclosed arrangements are possible without departing from the disclosure. Although the approach of the disclosure has been illustrated in the context of buck converters, it will be appreciated that the approach may be adapted for use with other types of converters such as boost or buck-boost converters. Accordingly, the above description of the specific embodiment is made by way of example only and not for the purposes of limitation. It will be clear to the skilled person that minor modifications may be made without significant changes to the operation described.

What is claimed is:

1. A switching converter comprising
    a first power switch coupled to a second power switch at a switching node;
    a mode detector adapted to detect a mode of operation of the first power switch and the second power switch, and to identify a first period during which the first power switch is turned on and operates in a linear mode while the second power switch is turned off; and
    a controller adapted to bias the second power switch with a predetermined voltage during the first period to turn on the second power switch during a second period, wherein in the second period the first power switch is operating in a saturation mode.

2. The switching converter as claimed in claim 1, wherein the predetermined voltage is less than a threshold voltage at which the second power switch starts drawing a current.

3. The switching converter as claimed in claim 1, wherein the controller is adapted to turn on the second power switch before the switching node reaches a voltage level sufficient to forward bias a body diode of the second power switch.

4. The switching converter as claimed in claim 1, wherein the mode detector comprises a first detector portion coupled to the first power switch and a second detector portion coupled to the second power switch.

5. The switching converter as claimed in claim 4, wherein the first detector portion comprises
    a reference voltage circuit adapted to generate a first voltage reference and a second voltage reference;
    a first comparator adapted to compare a drive voltage for driving the first power switch with the first voltage reference to generate a first control signal; and
    a second comparator adapted to compare the drive voltage with the second voltage reference to generate a second control signal.

6. The switching converter as claimed in claim 5, wherein the first reference voltage follows a control voltage of the power switch when operating in a linear mode, and wherein the second reference voltage follows a control voltage of the power switch when operating in a saturation mode.

7. The switching converter as claimed in claim 5, wherein the reference voltage circuit comprises a first current source and a second current source, the first current source being coupled to a first current mirror.

8. The switching converter as claimed in claim 7, wherein the second current source is coupled to a second current mirror.

9. The switching converter as claimed in claim 7, wherein the second current source is coupled to the first current mirror.

10. The switching converter as claimed in claim 5, wherein the first detector portion comprises a bias circuit for generating the predetermined voltage.

11. The switching converter as claimed in claim 10, wherein the bias circuit comprises an amplifier coupled to a diode.

12. The switching converter as claimed in claim 5, wherein the second detector portion is implemented in the same fashion as the first detector portion.

13. The switching converter as claimed in claim 7, wherein the first current source is adapted to generate a first current and the second current source is adapted to generate a second current, wherein the first current is greater than the second current.

14. The switching converter as claimed in claim 1, wherein the first power switch is a high-side power switch and wherein the second power switch is a low-side power switch and wherein a voltage at the switching node becomes negative at some point during the second period.

15. The switching converter as claimed in claim 1, wherein the first power switch is a low-side power switch and wherein the second power switch is a high-side power switch.

16. The switching converter as claimed in claim 15, comprising an inductor coupled to the switching node, and wherein the controller is adapted to turn off the low-side power switch while an inductor current of the inductor is negative.

17. The switching converter as claimed in claim 15, wherein the high-side power switch is turned on when the low-side power switch is in saturation to prevent the forward bias of the body diode of the high-side power switch.

18. A method of operating a switching converter having a first power switch coupled to a second power switch at a switching node; the method comprising
    detecting a mode of operation of the first power switch and the second power switch;
    identifying a first period during which the first power switch is turned on and operates in a linear mode while the second power switch is turned off; and
    biasing the second power switch during the first period to turn on the second power switch during a second period,
    wherein in the second period the first power switch is operating in a saturation mode.

19. The method as claimed in claim 18, wherein the predetermined voltage is less than a threshold voltage at which the second power switch starts drawing a current.

20. The method as claimed in claim 18, comprising turning on the second power switch before the switching node reaches a voltage level sufficient to forward bias a body diode of the second power switch.

* * * * *